United States Patent [19]

Marshall

[11] Patent Number: 5,245,533
[45] Date of Patent: Sep. 14, 1993

[54] MARKETING RESEARCH METHOD AND SYSTEM FOR MANAGEMENT OF MANUFACTURER'S DISCOUNT COUPON OFFERS

[75] Inventor: Robert Marshall, El Paso, Tex.

[73] Assignee: A. C. Nielsen Company, Northbrook, Ill.

[21] Appl. No.: 629,469

[22] Filed: Dec. 18, 1990

[51] Int. Cl.⁵ .................. G06F 15/22; G06F 15/24
[52] U.S. Cl. ......................... 364/401; 395/925
[58] Field of Search ............... 364/401, 225, 918; 395/925

[56] References Cited

U.S. PATENT DOCUMENTS

| | | | |
|---|---|---|---|
| 3,899,775 | 8/1975 | Larsen | 364/405 |
| 4,012,132 | 3/1977 | Lazarus | 106/429 |
| 4,014,004 | 3/1977 | Fuller | 455/54.2 |
| 4,141,078 | 2/1979 | Bridges, Jr. et al. | 364/419 |
| 4,166,540 | 9/1979 | Marshall | 209/555 |
| 4,208,652 | 6/1980 | Marshall | 382/18 |
| 4,210,961 | 7/1980 | Whitlow et al. | 395/600 |
| 4,290,688 | 9/1981 | Call | 355/1 |
| 4,331,973 | 5/1982 | Eskin et al. | 358/84 |
| 4,355,372 | 10/1982 | Johnson et al. | 379/92 |
| 4,500,880 | 2/1985 | Gomersall et al. | 340/825.35 |
| 4,546,382 | 10/1985 | McKenna et al. | 358/84 |
| 4,554,446 | 11/1985 | Murphy et al. | 235/487 |
| 4,588,881 | 5/1986 | Pejas et al. | 235/385 |
| 4,597,046 | 6/1986 | Musmanno et al. | 364/408 |
| 4,603,232 | 7/1986 | Kurland et al. | 379/92 |
| 4,630,108 | 12/1986 | Gomersall | 358/84 |
| 4,636,950 | 1/1987 | Caswell et al. | 364/403 |
| 4,642,767 | 2/1987 | Lerner | 364/406 |
| 4,658,290 | 4/1987 | McKenna et al. | 358/84 |
| 4,713,761 | 12/1987 | Sharpe et al. | 364/406 |
| 4,752,877 | 6/1988 | Roberts et al. | 364/408 |
| 4,774,663 | 9/1988 | Musmanno et al. | 364/408 |
| 4,775,935 | 10/1988 | Yourick | 364/401 |
| 4,816,904 | 3/1989 | McKenna et al. | 358/84 |
| 4,853,882 | 8/1989 | Marshall | 364/570 |
| 4,858,000 | 8/1989 | Lu | 358/84 |
| 4,882,675 | 11/1989 | Nichtberger et al. | 364/401 |
| 4,930,011 | 5/1990 | Kiewit | 358/84 |
| 4,937,742 | 6/1990 | Marshall | 364/401 |
| 4,949,256 | 8/1990 | Humble | 364/401 |
| 4,972,504 | 11/1990 | Daniel et al. | 455/2 |

Primary Examiner—Roy N. Envall, Jr.
Assistant Examiner—Laura Brutman
Attorney, Agent, or Firm—Marshall, O'Toole, Gerstein, Murray & Borun

[57] ABSTRACT

A market research system is provided for management of manufacturer's discount coupon offers. The market research system includes an automated coupon processing system for processing coupon redemption data. The coupon redemption data includes offer identification. At least one manufacturer provides a coupon release input. A central controller is coupled to the coupon processing system and the manufacturer for receiving the coupon redemption data and the coupon release input. The central controller defines a knowledge database responsive to the received coupon redemption data. Responsive to the defined knowledge database, the central controller generates a response template library. The central controller selects a response template from the generated response template library responsive to a received coupon release input and transmits the selected response template to the manufacturer.

20 Claims, 6 Drawing Sheets

Fig. 5

| OFFER VARIABLES | MEDIA | SHELF PRICE | CATEGORY | FACE VALUE | EXPIRATION | OTHER | MANUFAC- TURER | PRODUCT |
|---|---|---|---|---|---|---|---|---|
| VARIABLES CODE DIGITS | 1 OR 2 | 2 | 1 | 2 | 1 | 10 | 3 | 2 |
| OPTIONS | 10-100 | 100 | 10 | 100 | 10 | $10^{10}$ | 1000 | 100 |
| | ON PACK DIRECT MAIL FSI ROP MAG INSTANT IN PACK ETC | COMMON VALUES | DRUG FOOD HOUSEHOLD CHEM HBA ETC | COMMON VALUES | 23 MONTHS 3 - 6 6 - 12 12 - 24 NONE | AREA COLOR SIZE POSITION OVERLAY TOPIC MULTI ETC | SPECIFIC MANUFAC- TURER | SPECIFIC PRODUCT CLASSES |

Fig. 8

Fig. 9A
FORECASTING TEMPLATE

| DROP RATE | PROMOTION | VARIABLES CODE | RESPONSE FOR MONTHLY PERIOD - % REDEEMED | | | | | | | | | | TOTAL REDEMPTION % |
|---|---|---|---|---|---|---|---|---|---|---|---|---|---|
| | | | 1 | 2 | 3 | 4 | ... | 12 | ... | 21 | 22 | 23 | 24 | |
| $T_{N-4}$ | 176 54861 | 120...896 | 0.93 | 1.58 | 1.41 | 1.32 | | 0.37 | | 0.10 | 0.08 | 0.03 | 0.01 | 6.2 |
|  | 176 68793 | 127...326 | 0.74 | 1.24 | 1.39 | 1.20 | | 0.46 | | | | 0.04 | 0.00 | 4.3 |
| $T_{N-3}$ | | | 0.68 | 1.67 | 1.46 | 1.09 | | 0.51 | | | | 0.04 | 0.02 | 7.9 |
|  | | | 0.79 | 1.84 | 1.58 | 1.41 | | 0.29 | | | 0.06 | 0.02 | 0.01 | 8.7 |
| $T_{N-2}$ | | | | 1.32 | 1.47 | 1.18 | | 0.44 | | | 0.09 | 0.04 | 0.03 | 3.6 |
|  | | | 1.01 | 1.51 | 1.29 | 1.21 | | 0.41 | | | 0.10 | 0.05 | 0.00 | 4.9 |
|  | | | 0.95 | 1.49 | 1.37 | 1.19 | | 0.26 | | | 0.06 | 0.03 | 0.01 | 5.3 |
| $T_{N-1}$ | | | 0.98 | 1.52 | 1.37 | 1.07 | | | | | 0.07 | 0.02 | 0.00 | 5.9 |
|  | | | 0.91 | | 1.41 | | | | | | 0.09 | 0.02 | | |
| $T_N$ | | | | | | | | | | | | | | |

Fig-9

| 1 DIGIT | 1 DIGIT | 1 DIGIT | 2 DIGITS | 10 DIGITS ? | 3 DIGITS | 2 DIGITS |
|---------|---------|---------|----------|-------------|----------|----------|
| MEDIA | CATEGORY | EXPIR'TN DATE | FACE VALUE | OTHERS | MANUFAC-TURER | PRODUCT |

- MEDIA: FSI 1000...00 (PATH); ON PACK 2000...00
- CATEGORY: DRUG 1100...00; HOUSEH'D CHEMS. 1200...00; FOOD 1300...00; HBA 1400...00; OTHER 1500...00
- EXPIR'TN DATE: SHORT 1310...00; LONG; SHORT 1330...00; LONG; SHORT 1350...00; LONG 1360...00
- FACE VALUE: 1.50+ 13611...00; 1.00–1.50; 0.90; 0.80; 13614...00; 0.70; 0.60; 13616...00; 0.50; 0.40; 13618...00; 0.30; 0.25; 0.20; 13521...00
- OTHERS: AREA, COLOR, COUPON SIZE, OVERLAY, POSITION, MULTI-COUPON, SELF DESTRUCT, ETC; 13611295..00; 13611296..00; 13611297..00
- MANUFACTURER: 13611297..163; 13611297..171
- PRODUCT: 13611247..171

MARKETING RESEARCH METHOD AND SYSTEM FOR MANAGEMENT OF MANUFACTURER'S DISCOUNT COUPON OFFERS

BACKGROUND OF THE INVENTION

1. Field of the Invention

The present invention relates generally to systems and methods for processing price discount coupons issued by manufacturers, and more particularly to a market research system and method for management of manufacturer's discount coupon offers.

2. Description of the Prior Art

Manufacturer discount coupons are being increasingly used to encourage the purchase of consumer goods and services by manufacturers nationwide. A typical manufacturer's discount coupon gives consumers the opportunity to buy a specific product of the manufacturer at a discount, for example, fifty cents less than the normal retail price for that product. Some discount coupons have a specified expiration date and others have no expiration date. Coupon offers are made by various ways, such as, by publication as a free-standing insert (FSI) in newspapers or magazines, direct mail, in-package or on-package coupons and in-store coupon distribution. Consumers redeem the coupon at the point of sale by a retailer, such as a supermarket, that subsequently sends the redeemed coupons to a clearing house or to the manufacturer issuing the coupons.

Various arrangements have been employed for the collection, summarization and forwarding of Point-Of-Sale purchasing information from retail stores for purposes of market research since the advent of Point-Of-Sale (POS) optical scanners and the widespread use of the Universal Product Code (UPC) to identify retain products. Typically, retail purchase data is summarized by an in-store POS controller or by a separate store computer attached to the POS controller in the store or, if the store is part of a large retail store chain, by a central or host computer at the headquarters of the retail store chain. The summarized retail purchase data is then typically forwarded to the users of the data by any one of a number of different data storage and transmission techniques, for example, by magnetic tape or disk or diskette or by telephonic data transmission or by over-the-air data transmission.

The following prior art patents bear at least some relation to one or more of the disclosed features of the present invention:

| INVENTOR(S) | U.S. Pat. No. | TITLE |
|---|---|---|
| Larsen | 3,899,775 | AUTOMATIC STORE TRANSACTION SYSTEM AND TERMINAL THEREFOR |
| Lazarus | 4,012,132 | BROADCAST MARKET SURVEY DATA STORAGE AND RETRIEVAL SYSTEM AND METHOD |
| Fuller | 4,014,004 | AUTOMATIC REPORT REGISTER |
| Bridges, Jr. et al | 4,141,078 | LIBRARY CIRCULATION CONTROL SYSTEM |
| Marshall | 4,166,540 | DOCUMENT SORTER UTILIZING CASCADED SORTING STEPS |
| Marshall | 4,208,652 | METHOD AND APPARATUS FOR IDENTIFYING IMAGES |
| Whitlow et al | 4,210,961 | SORTING SYSTEM |
| Call | 4,290,688 | APPARATUS FOR COLLECTING MARKET SURVEY DATA FROM UNIVERSAL PRODUCT TYPE CODED ITEMS |
| Eskin et al | 4,331,973 | PANELIST RESPONSE SCANNING SYSTEM |
| Johnson et al | 4,355,372 | MARKET SURVEY DATA COLLECTION METHOD |
| Gomersall et al | 4,500,880 | REAL TIME, COMPUTER-DRIVEN RETAIL PRICING DISPLAY SYSTEM |
| McKenna et al | 4,546,382 | TELEVISION AND MARKET RESEARCH DATA COLLECTION SYSTEM AND METHOD |
| Murphy et al | 4,554,446 | SUPERMARKET INVENTORY CONTROL SYSTEM AND METHOD |
| Pejas et al | 4,588,881 | SYSTEM FOR MONITORING THE MOVEMENTS OF GOODS INWARDS AND/OR OUTWARDS |
| Musmanno et al | 4,597,046 | SECURITIES BROKERAGE-CASH MANAGEMENT SYSTEM OBVIATING FLOAT COSTS BY ANTICIPATORY LIQUIDATION OF SHORT TERM ASSETS |
| Kurland et al | 4,603,232 | RAPID MARKET SURVEY COLLECTION AND DISSEMINATION METHOD |
| Gomersall | 4,630,108 | PREPROGRAMMED OVER-THE-AIR MARKETING RESEARCH SYSTEM |
| Caswell et al | 4,636,950 | INVENTORY MANAGEMENT SYSTEM USING TRANSPONDERS ASSOCIATED WITH SPECIFIC PRODUCTS |
| Lerner | 4,642,767 | BOOKKEEPING AND ACCOUNTING SYSTEM |
| McKenna et al | 4,658,290 | TELEVISION AND MARKET RESEARCH DATA COLLECTION SYSTEM AND METHOD |
| Sharpe et al | 4,713,761 | SYSTEM FOR CENTRALIZED PROCESSING OF ACCOUNTING AND PAYMENT FUNCTIONS |
| Roberts et al | 4,752,877 | METHOD AND APPARATUS FOR FUNDING A FUTURE LIABILITY OF UNCERTAIN COST |
| Musmanno et al | 4,774,663 | SECURITIES BROKERAGE-CASH MANAGEMENT SYSTEM WITH SHORT TERM INVESTMENT PROCEEDS ALLOTTED AMONG MULTIPLE ACCOUNTS |
| Yourick | 4,775,935 | VIDEO MERCHANDISING SYSTEM WITH VARIABLE AND ADOPTIVE PRODUCT SEQUENCE PRESENTATION ORDER |
| McKenna et al | 4,816,904 | TELEVISION AND MARKET RESEARCH DATA COLLECTION SYSTEM AND METHOD |

-continued

| INVENTOR(S) | U.S. Pat. No. | TITLE |
|---|---|---|
| Marshall | 4,853,882 | SYSTEM AND METHOD FOR PROTECTING AGAINST REDUNDANT MAILINGS |
| Lu | 4,858,000 | IMAGE RECOGNITION AUDIENCE MEASUREMENT SYSTEM AND METHOD |
| Nichtberger et al | 4,882,675 | PAPERLESS SYSTEM FOR DISTRIBUTING, REDEEMING AND CLEARING MERCHANDISE COUPONS |
| Kiewit | 4,930,011 | METHOD AND APPARATUS FOR IDENTIFYING INDIVIDUAL MEMBERS OF A MARKETING AND VIEWING AUDIENCE |
| Marshall | 4,937,742 | AUTOMATED SYSTEM FOR STATISTICALLY ANALYZING DATA CHARACTERISTICS OF SHIPMENTS OF COUPONS TO IDENTIFY INSTANCES OF COUPON SHIPMENT PARAMETRIC ABNORMALITIES |
| Daniel et al | 4,972,504 | MARKETING RESEARCH SYSTEM AND METHOD FOR OBTAINING RETAIL DATA ON A REAL TIME BASIS |

The Mckenna et al '382 patent concerns, inter alia, a data collection system for collecting at a central location television viewing data and retail purchase data from a plurality of cooperating households. Each of the households includes a hand-held optical scanner for reading bar codes, i.e., UPC codes, associated with retail products purchased by the household. Scanned retail product purchase data and the television viewing data are stored in a common memory in the household and are periodically transmitted by telephone to a central site for processing and market research analysis.

The Eskin et al '973 patent, the Cogswell et al '974 patent and the Wright, Jr. '589 patent disclose, inter alia, a market research system utilizing a plurality of cooperating retail stores for obtaining and transmitting to a central location retail product purchase information concerning a plurality of cooperating panelists. The POS scanners in each of the cooperating retail stores scan bar encoded panelist identification cards and the UPC codes on the products purchased by each such panelist. Each retail store's in-store computer then stores a record of the products purchased by each such cooperating panelist, which record is subsequently transferred to a market research company at a remote location for analysis and possible correlation with television viewing data obtained from the same cooperating panelists.

The Gomersall '108 patent is directed to an over-the-air market research system and method and discloses, inter alia, the collection of retail product purchase information from a plurality of cooperating households by means of a UPC scanner provided to each information may be obtained from cooperating retail stores in a test area. Each store's computer stores and periodically forwards a record of the retail products purchased by each cooperating household, identified by a scanned or manually entered identification code for each cooperating household, which information is periodically transmitted by telephone to a central computer for analysis by market researchers. The information transmitted typically includes at least an identification of the cooperating household, an identification of the retail product purchases made by that household and the identification of the retail store transmitting the data. As disclosed in the '108 patent, the data collected, stored and transmitted by each such store may also include the price of each retail product purchased, the date of the purchase and the time of the purchase.

The Larsen '775 patent discloses, inter alia, an automatic store transaction system in which a keyboard is provided at each POS terminal for entering data. A transceiver is also provided at each POS terminal for transmitting data to and receiving data from a central processor. The system is particularly useful for inventory control and for providing data on sales rates and checker productivity.

The Johnson et al '372 patent, reissued as U.S. Pat. No. Re. 31,951, discloses, inter alia, a market research data collection system in which market research data, corresponding to the retail products purchased by a cooperating panelist, are transmitted by telephone from each cooperating household to a remotely located central computer for processing and market research analysis. The data collection system includes a hand-held optical scanner located in each household for scanning and storing UPC codes and for entering and storing other related data, for example, the identification of the retail store at which the retail products were purchased.

The Bridges, Jr. et al '078 patent discloses, inter alia, a library book circulation control system utilizing optical scanners for reading bar codes associated with library books.

The Gomersall et al '880 patent discloses, inter alia, a computer operated retail pricing display system for displaying pricing and other information in real-time at the shelf or bin location of a product in a retail store.

A system corresponding at least in part to that disclosed in the above-identified Eskin et al '973 patent and the Cogswell et al '974 patent and the Wright, Jr. '589 patent has been used to obtain market research data from a plurality of cooperating retail stores. The market research data obtained thereby is dependent upon cooperation by the store operators and upon the data collection and processing characteristics of each in-store computer or controller that controls the POS scanners/registers.

The Nichtberger et al. '675 patent discloses an in-store paperless system for electronically distributing, redeeming and clearing merchandise coupons.

The Murphy et al. '446 patent discloses a supermarket inventory control system including a sales voucher printer located in each store for printing machine readable coded sales vouchers, an in-store data processor for controlling a plurality of POS terminals and a single scan coupon concentrator at each store for processing coupon redemption and sale voucher information to identify compliance with coded conditions and transmitting control signals to the in-store data processor for crediting customers, collecting money, or indicating non-compliance. A remotely located scan host computer periodically retrieves accumulated sales voucher information from the scan coupon concentrator for transmission to the manufacturers for processing. A remotely located chain host computer periodically retrieves accumulated total sales information from the instore data processor.

The Marshall '540 patent discloses an automatic document sorter that performs a plurality of cascaded sorting steps, particularly suitable for automatically sorting diverse retail store coupons having a wide variety of physical characteristics and at the same time being able to differentiate between virtually identical coupons from different offers.

The Marshall '652 patent discloses an image identification system and method particularly suitable for identifying an image of a manufacturer's coupon.

The Marshall '742 patent discloses an automated system and method for statistically analyzing data characteristics of shipments for coupons to identify coupon shipment parametric abnormalities. An operational knowledge database in which data characteristics of interest associated with a plurality of previously processed coupon shipments from a plurality of retail stores is used to statistically derive allowable ranges for comparison with data characteristics of new coupon shipments. A decision to pay the submitting retail stores or to deny payment or refer the payment decision to the involved manufacturers is provided.

While many of the above prior art systems and methods constitute significant improvements over prior manual systems and methods of collecting market research data, many make no provision for the collection of coupon information. None of the above prior art systems and methods provide an automated approach for management of manufacturer's discount coupon offers.

SUMMARY

It is an object of the present invention to provide a new and improved market research system and method for management of manufacturer's discount coupon offers.

It is another object of the present invention to provide a market research system and method for management of manufacturer's discount coupon offers that does not require any change in retail sales procedures nor any modification of existing point of sale systems.

It is another object of the present invention to provide a market research system and method for management of manufacturer's discount coupon offers utilizing simple and inexpensive data processing equipment and that minimizes the amount of data processing required.

It is another object of the present invention to provide a market research system and method for management of manufacturer's discount coupon offers that overcomes many of the disadvantages of prior art systems.

In brief, the objects and advantages of the present invention are achieved by a market research system for management of manufacturer's discount coupon offers including an automated coupon processing system for processing coupon redemption data. The coupon redemption data includes offer identification. At least one manufacturer provides a coupon release input. A central controller is coupled to the coupon processing system and the manufacturer for receiving the coupon redemption data and the coupon release input. The central controller defines a knowledge database responsive to the received coupon redemption data. Responsive to the defined knowledge database, the central controller generates a response template library. The central controller selects a response template from the generated response template library responsive to a received coupon release input and transmits the selected response template to the manufacturer.

BRIEF DESCRIPTION OF THE DRAWING

The present invention together with the above and other objects and advantages may best be understood from the following detailed description of the embodiment of the invention illustrated in the drawing, wherein:

FIGS. 5 and 6 illustrate exemplary variables coding used in the marketing research system of FIG. 1;

FIG. 7 illustrates an exemplary knowledge database arrangement of the marketing research system of FIG. 1.

DETAILED DESCRIPTION OF THE PREFERRED EMBODIMENT

Figure 1:
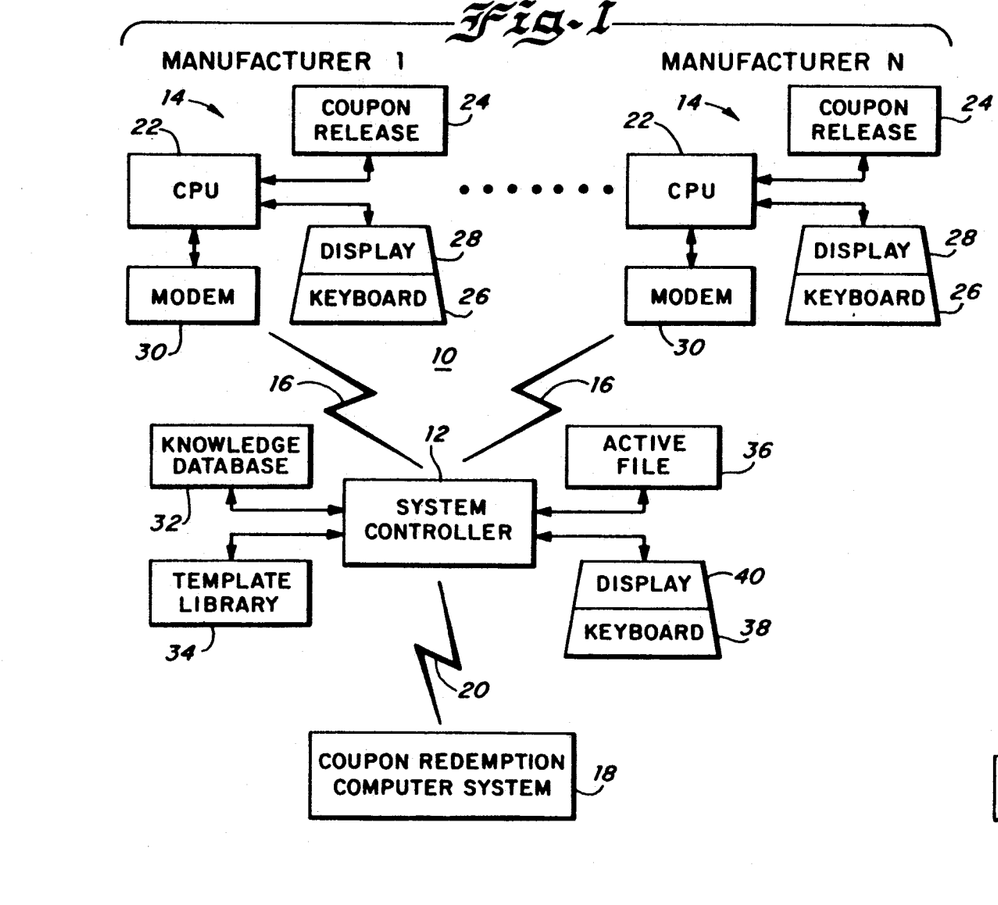
FIG. 1 is a block diagram of a market research coupon management system according to the present invention.

Referring now to the drawing, in FIG. 1 there is illustrated a coupon management marketing research system generally designated by the reference character 10. Market research system 10 includes a central system controller 12 that supervises, implements and coordinates coupon offers by a plurality of manufacturers (MANUFACTURER 1—MANUFACTURER N) generally designated by the reference character 14. Each manufacturer 14 is coupled to the central system controller 12 via a communications link generally designated by the reference character 16. Coupon redemption data is received by the central system controller 12 from an automated coupon redemption computer system 18 via a communication link 20.

A coupon redemption computer of the type disclosed by Marshall, U.S. Pat. No. 4,937,742 advantageously can be used for the automated coupon redemption computer system 18. Coupon redemption data identified and stored by the automated coupon redemption computer system 18 includes information identifying a particular manufacturer's offer for the coupons being redeemed utilizing an automatic document sorter, for example, such as disclosed by Marshall, U.S. Pat. No. 4,166,540. The disclosures of the above-mentioned Marshall patents are incorporated herein by reference.

Each manufacturer 14 is provided with a central processing device 22 with an associated memory 24, a keyboard 26 and a display 28. An input/output device, such as a modem 30 advantageously is provided for bidirectional communications with the central system controller 12 via a corresponding communications link 16. Various conventional arrangements can be used for the communications links 16 and 20, for example, such as, via telephone lines connected to the public switched telephone network or via mailable memory devices. Alternatively, a printed coupon release input and printed template responses and forecast budget values can be used for communicating information between one or more of the manufacturers 14 and the central system controller 12.

Central system controller 12 collects and processes market research coupon offer data to generate and maintain a knowledge database 32, a template library 34 and an active offer file 36. A keyboard 38 and a display 40 are coupled to the central controller 12 for entering and displaying program information and data. Various commercially available microprocessor devices having standard capabilities can be used for the central system controller 12, for example, such as a 80386 high integration 32-bit microprocessor manufactured and sold by Intel Corporation of Santa Clara, Calif. Alternatively, multiple computer systems can be used together for the central system controller 12 depending on the coupon redemption processing method and amount of market research data collected.

Figure 2:
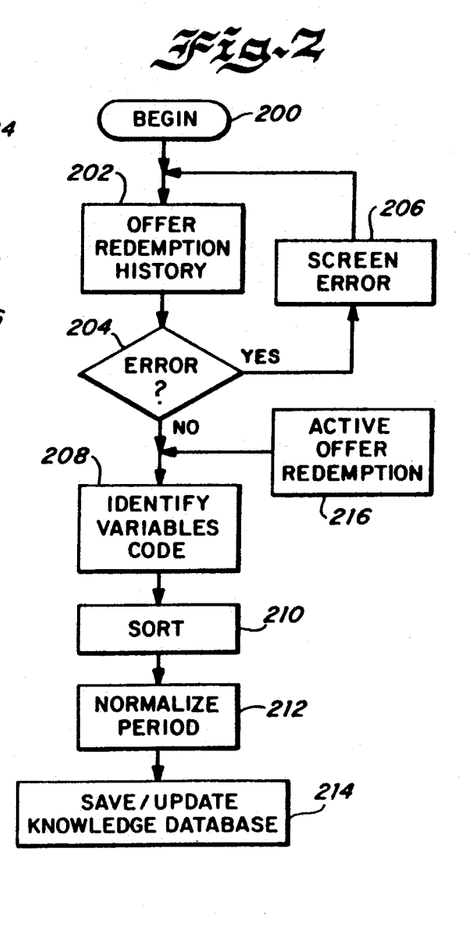
FIGS. 2-4 are flow charts illustrating logical steps performed by the central computer of the marketing research system of FIG. 1 in accordance with the method of the present invention.
Figure 3:
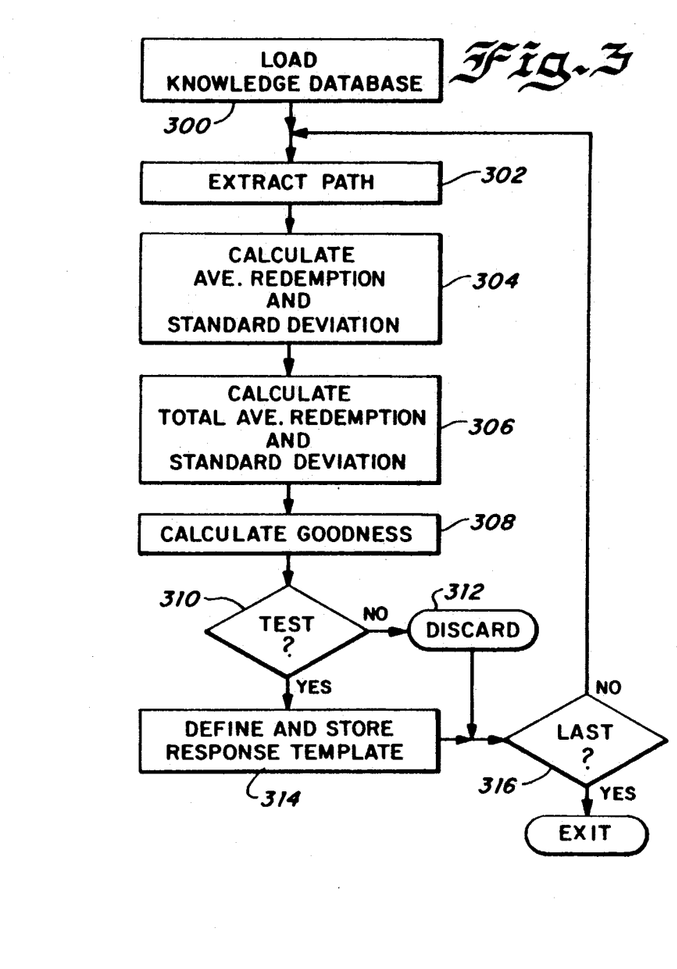
Figure 4:
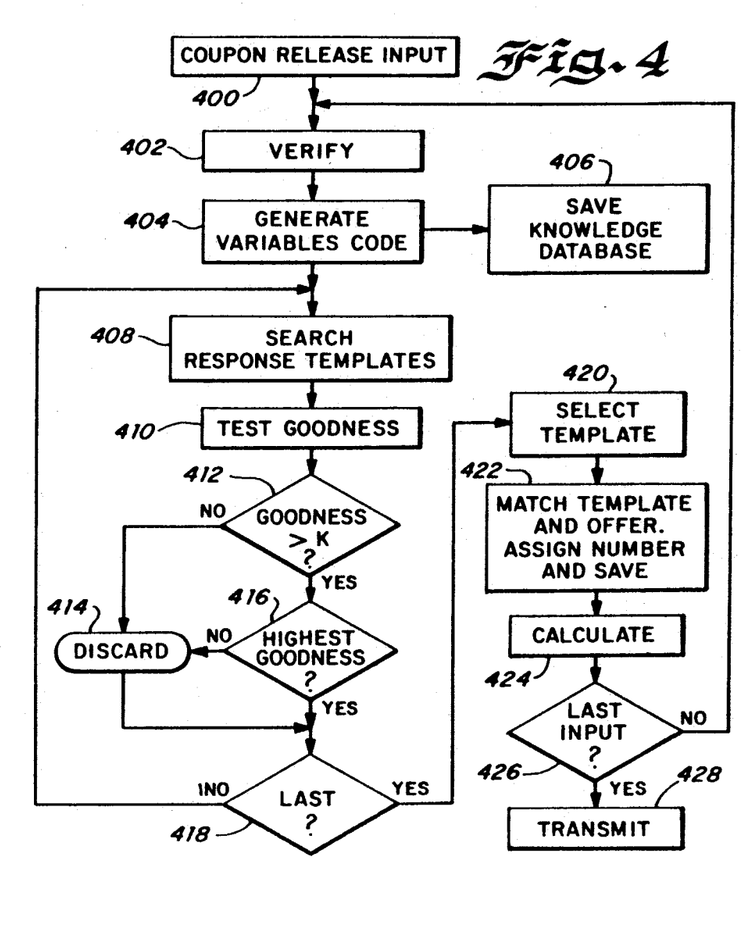

FIGS. 2-4 are flow charts illustrating logical steps performed by the central system controller 12 in the operation of the marketing research system 10. Referring initially to FIG. 2, the sequential operations for building the knowledge database 32 are illustrated beginning as indicated at a block 200. First offer redemption history data is loaded from the coupon redemption computer system 18 as indicated at a block 202. Next error checking is performed as indicated at a block 204 and identified erroneous data is screened as indicated at a block 206. Identified erroneous data includes data earlier than a predefined date not utilized in the knowledge database, described below with respect to FIG. 7. Otherwise when valid data is identified, variables code is identified for coding the offer redemption data as indicated at a block 208.

Figure 5:
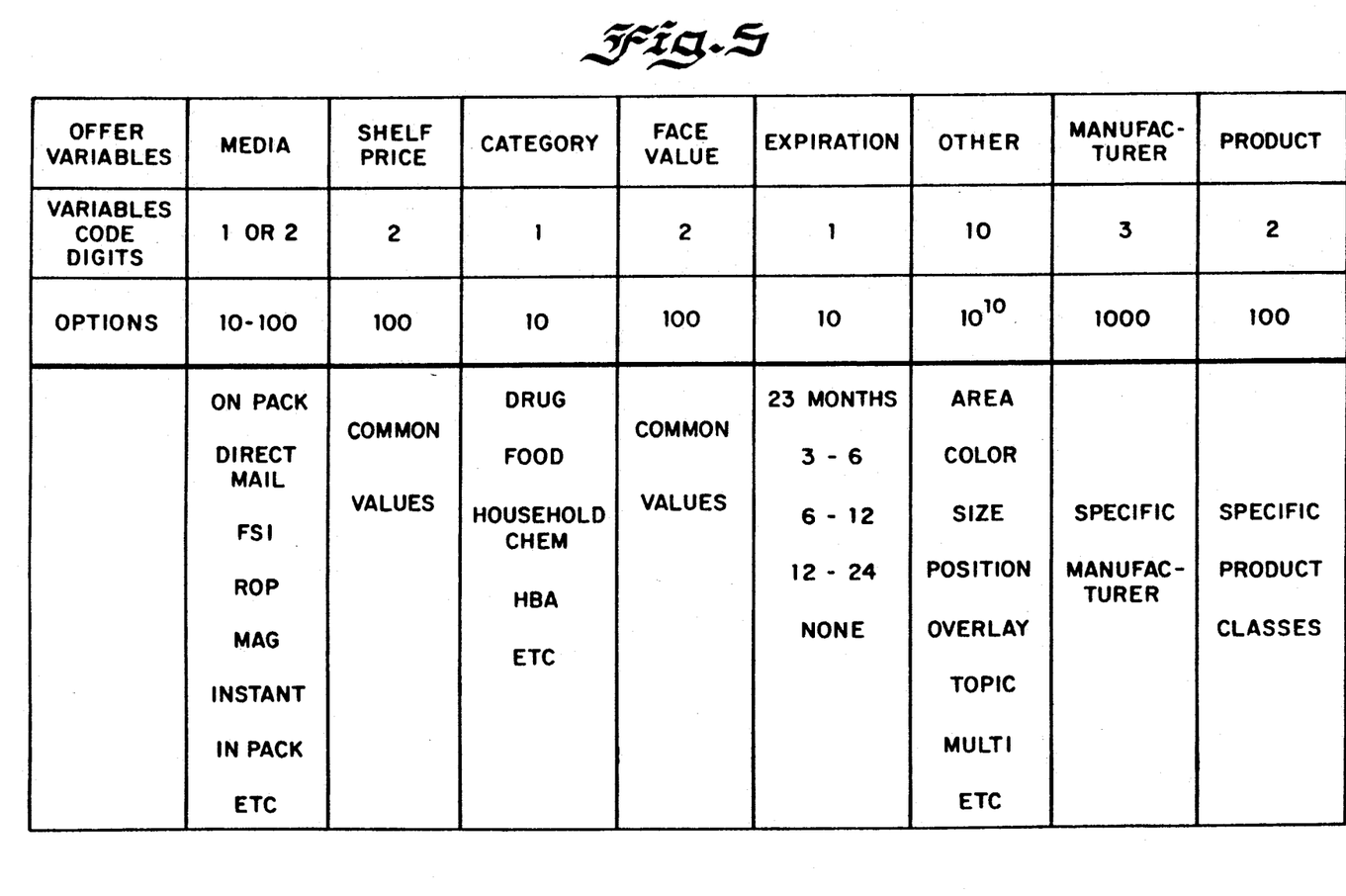

Referring also to FIG. 5, exemplary offer variables including media, shelf price, category, face value, expiration, other offer and coupon characteristics, manufacturer and product is shown with exemplary number of variables code digits and options utilized at the block 208 in FIG. 2. Referring also to FIG. 6, an example of a particular variables code for a coupon offer code is shown.

An offer variables coding feature of the invention is shown in FIGS. 5 and 6, in that the most significant offer variables for a coupon offer are shown from left-to-right. For a coupon offer, the first coded variable representing the distribution media can be 1-digit used to represent 10 predefined distributions options (0-9) including, for example, such as, on pack, direct mail, free-standing-insert FSI, ROP, magazine, instant, in pack, etc. Alternatively, when 2-digits are used, 100 distribution options (0-99) can be represented. The second coded variable representing shelf price of the product associated with the coupon offer is represented by 2-digits corresponding to common currency values. The distribution media and the shelf price are the most significant variables affecting all coupon offers.

Next significant offer variables are the face value of the coupon represented by 2-digits corresponding to common currency values and the expiration date of the coupon represented by 1-digit corresponding to 10 predefined expiration options, such as 23 months, 3-6 months, 6-12 months, 12-24 months or no expiration date. Other offer and coupon characteristics are represented by 10-digits having a predefined order, for example, such as corresponding to geographical area, coupon color, size, position, overlay, topic, multi-coupon offering, etc. Next a specific manufacturer, such as XYZ Company, is represented by 3-digits corresponding to one of 1000 specific manufacturers. Lastly, specific product classification is represented by 2-digits corresponding to one of 100 specific product classes.

Referring again to FIG. 2, next the offer redemption history data is sorted by the identified variables code as indicated at a block 210. Period normalization of the data is performed as indicated at a block 212 to adjust for time related factors, for example, such as, holidays, work calendar and other factors. Next the time period normalized data is then saved in the knowledge database 32 as indicated in a block 214.

Active offer redemption data is loaded as indicated at a block 216. Then sequential operations described with respect to blocks 208, 210, and 212 are performed for processing the active offer redemption data. Then the knowledge database 32 is updated with the active offer redemption data as indicated at the block 214.

Updating of the knowledge database 32 may be best understood with reference to FIG. 7. In FIG. 7 there is shown a chart illustrating the arrangement of offer data saved in the knowledge database 32. A drop date for coupon offers identified by promotion code and the identified variables code is indicated in the first column by $T_{N-4}$, $T_{N-3}$, $T_{N-2}$, $T_{N-1}$ and $T_N$, where $T_N$ represents the most current drop date and $T_{N-4}$ represents the oldest drop date. As shown, a predetermined time period of 24 months includes predefined monthly intervals 1-24 for storing offer redemption data in the knowledge database 32. Monthly redemption percentages are saved for offers identified by a promotion code and an identified variables code for predefined intervals within the predetermined overall time period for the knowledge database 32 on a first-in, first-out basis. The knowledge database 32 is updated at block 214 in FIG. 2 with current active offer redemption data saved in the first time interval and existing data shifted forward by one time interval. Thereby the existing data stored for the last time interval is eliminated or retired from the knowledge database 32 with each updating operation. A total redemption percentage for each completed offer including a stored redemption percentage for all periods within the overall time interval is illustrated.

As indicated by the dashed lines banding the illustrated percentages redemption data in knowledge database 32, only data for the last time interval 24 remains for the oldest offer drop date $T_{N-4}$. Data for the first interval or intervals is saved for later offer drop dates $T_N$, $T_{N-1}$, $T_{N-2}$, and $T_{N-3}$. This procedure for periodically updating the knowledge database 32 with active offer redemption data provides an effective realtime adaptation of the knowledge database 32 for current external factors affecting coupon offers.

Referring now to FIGS. 3, 8, 9A and 9B, response templates and the sequential operations for defining response templates are illustrated. The illustrated response templates of FIGS. 8, 9A and 9B further may be understood by reference to the monthly redemption percentages listed by period in FIG. 7 which depicts that most coupon redemption occurs in the earlier periods, with periods 3-5 providing the most significant data.

In FIG. 3, the sequential operations begin with loading the knowledge database 32 as indicated at a block 300. A first data path is extracted using the variables code identified at the block 208 in FIG. 2. For example, all database entries beginning with a zero variables code can be first extracted from the knowledge database 32 at the block 302. In this group for each monthly response period, the average redemption is computed along with a standard deviation s to identify a statistical measure of the data spread on dispersion. For example, the average redemption can be calculated by:

$$\bar{x} = \frac{\sum_{x=1}^{n} x_i}{n}$$

where n is the number of events (points) and $\bar{x}$ the magnitude of each event.

Figure 9:
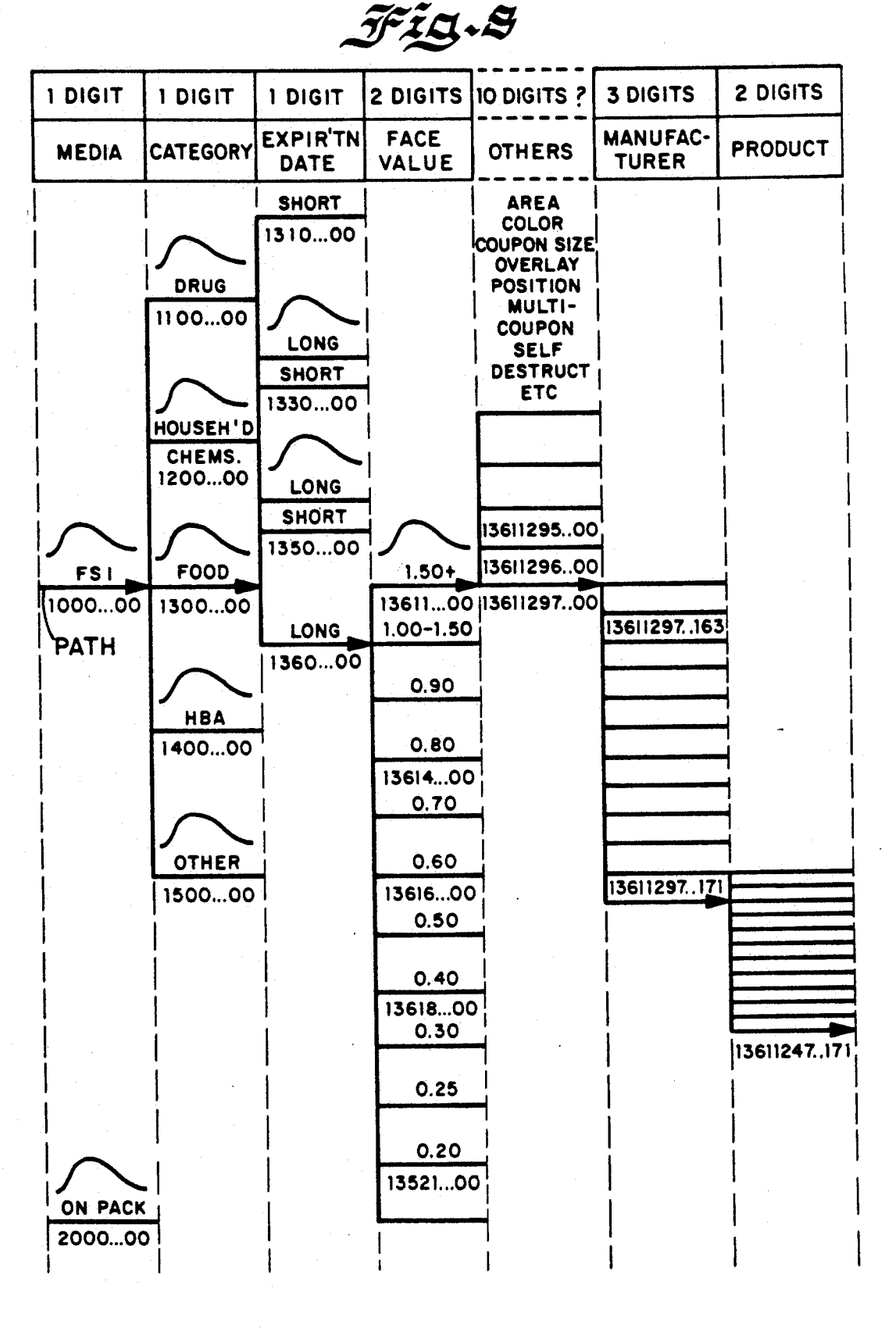
Figure 9A:
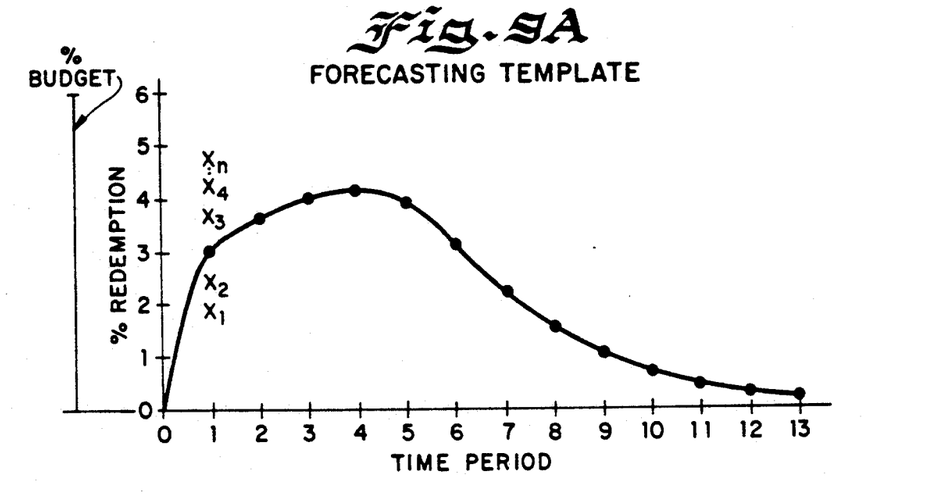

In FIG. 9A, a curve or response template for multiple calculated coupon redemption percentages at predetermined intervals over a predetermined time period is shown. A plurality of points $X_1$-$X_n$ illustrate actual redemption percentages for different coupon offers. A total budget for a coupon offer is illustrated at a line labelled % BUDGET corresponding to an integration of the area under the forecasting template curve. The total budget number can be calculated by summing the redemption percentage for each time interval of the predetermined redemption period P for the knowledge database 32.

A value for the standard deviation s for all points on the time span can be calculated by:

$$s = \sqrt{\frac{\sum_{i=1}^{n}(x_i - x)^2}{n - 1}}$$

Figure 9B:
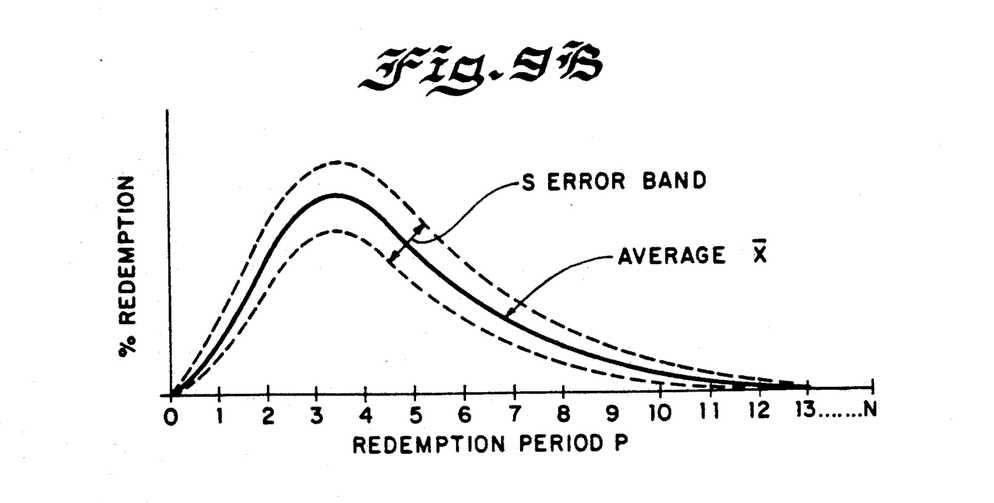

Next the total average redemption and standard deviation is calculated as indicated at a block 306. Next a Goodness Factor G is calculated by dividing the sum of all the redemption averages x by the sum of all the standard deviations s as indicated at a block 308. Referring also to FIG. 9B, the Goodness Factor G may be visualized as the total area under the template average curve divided by the total area within a relative error band of width s.

Next the Goodness Factor G is tested as indicated at a decision block 310 before a response template is defined and saved as indicated at a block 314. When a Goodness Factor G of less then a predetermined value, for example, such as 2, is identified at block 310, then the data is discarded as indicated at block 312. Next it is determined if additional variable paths are remaining as indicated at a decision block 316 labelled LAST?. The sequential steps are repeated until all database entries have been processed to form stratified variables code response templates as illustrated in FIG. 8.

Referring now to FIG. 4, there is illustrated sequential operations performed by the central controller 12 for selecting a response template responsive to a coupon release input from a particular manufacturer 14. First, the coupon release input data is received from the manufacturer 14 as indicated at a block 400. The received data is verified as indicated at a block 402. Next a variables code for the received coupon release input data is generated as indicated at a block 404 and saved in the knowledge database 32 as indicated at a block 406. Sequential searching of the response templates stored in the template library 34 is performed as indicated at a block 408.

Figure 8:
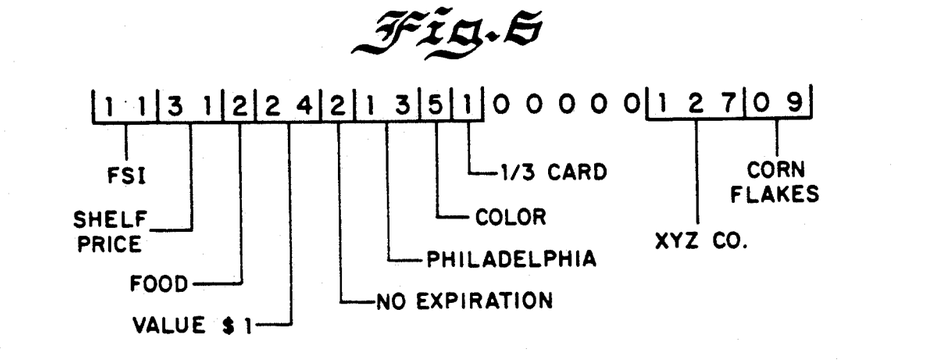
FIGS. 8, 9A and 9B illustrate exemplary response templates provided by the marketing research system of FIG. 1.

Referring also to FIG. 8, following arrows at a line PATH illustrates an example path for sequentially searching response templates stored in the template library 34 using the hierarchical variables code.

The Goodness Factor G for each response template is tested as indicated at block 410. Next the Goodness Factor G is compared to a predetermined value k as indicated at a decision block 412. When the Goodness Factor G for the retrieved response template is less than the predetermined value k, then the response template is not used or discarded as indicated at a block 414. Next it is determined if the retrieved response template has the highest Goodness Factor G of the response templates that have been retrieved in the search as indicated at a decision block 416 labelled HIGHEST GOODNESS?. If not, the response template is discarded as indicated at the block 414. Otherwise when the highest Goodness Factor G is identified at the block 416, then it is determined if the current response template is the last template within the template library 34 as indicated at a decision block 418 labelled LAST?. When the last response template is identified at the block 418, then the sequential operations are repeated returning to block 408.

The response template having the highest Goodness Factor G within the template library 34 is selected as indicated at a block 420. Then the selected response template is matched with the offer, assigned a number and saved as indicated at a block 422. Next the total budget % BUDGET for the coupon offer is calculated based upon the selected response template as indicated at a block 424. The sequential operations are again repeated until a last data input from the manufacturer is identified at a decision block 426. When the last input is identified at a decision block 426, then the calculated budget and response template or templates are transmitted to the requesting manufacturer 14.

While the invention has been described with reference to details of the illustrated embodiment, these details are not intended to limit the scope of the invention as defined in the appended claims.

I claim:

1. A market research system for management of manufacturer's discount coupon offers comprising:
   coupon processing means for processing coupon redemption data; said coupon redemption data including offer identification;
   manufacturer input means for providing a coupon release input; and
   central controller means coupled to said coupon processing means and said manufacturer input means for receiving said coupon redemption data and said coupon release input; said central controller means including means responsive to said received coupon redemption data for defining a knowledge database; means responsive to said defined knowledge database for generating a response template library; means responsive to said received coupon release input for selecting a response template from said generated response template library; and means for transmitting said selected response template to said manufacturer.

2. A market research system as recited in claim 1 wherein said received coupon redemption data includes predetermined offer variables which defines said offer identification, said predetermined offer variables corresponding to distribution media, product shelf price, coupon value and expiration date.

3. A market research system as recited in claim 2 wherein said knowledge database defining means includes means responsive to said predetermined offer variables for generating a variables code and means for saving said knowledge database responsive to said generated variables code.

4. A market research system as recited in claim 3 wherein said response template library generating means includes means responsive to said generated variables code for extracting coupon redemption data; and means for calculating an average redemption value and a standard deviation value for said extracted coupon redemption data at predetermined intervals within a predefined time period.

5. A market research system as recited in claim 4 further includes means for calculating a total average redemption value and a total standard deviation value for said predefined time period.

6. A market research system as recited in claim 5 further includes means responsive to said calculated total average redemption value and said total standard deviation value for calculating a Goodness Factor.

7. A market research system as recited in claim 6 further includes means for comparing said calculated Goodness Factor with a predetermined threshold value and means for saving a response template responsive to said calculated Goodness Factor being greater than said predetermined threshold value.

8. A market research system as recited in claim 7 wherein said response template selecting means includes means responsive to said predetermined offer variables for generating a variables code for said coupon release input.

9. A market research system as recited in claim 8 further includes means responsive to said generated variables code for said coupon release input for searching said response template library and means for identifying a response template from said response template library having a highest Goodness Factor.

10. A market research system as recited in claim 9 further including means for calculating a total redemption value for said identified response template having the highest Goodness Factor.

11. A market research system as recited in claim 1 wherein said central controller means includes means for periodically receiving said coupon redemption data for defining an updated knowledge database.

12. A market research system as recited in claim 11 wherein said periodically received coupon redemption data is active offer coupon redemption data.

13. A market research system as recited in claim 11 wherein said means for periodically receiving said coupon redemption data for defining an updated knowledge database includes means for generating a variables code corresponding to predetermined offer variables.

14. A market research system as recited in claim 13 wherein said means for periodically receiving said coupon redemption data for defining an updated knowledge database further includes means for sorting said periodically received coupon redemption data by said generated variables code.

15. A market research system as recited in claim 11 wherein said periodically received coupon redemption data is saved on a first-in first-out basis in said updated knowledge database.

16. A market research system as recited in claim 15 wherein said knowledge database includes a plurality of sequential spaces corresponding to a predefined plurality of time intervals and wherein periodically received coupon redemption data is saved at a first time-interval space of said sequential spaces and existing stored data is shifted by one time-interval space, whereby existing saved data at a last time-interval space of said sequential spaces is deleted from the updated database.

17. A market research system as recited in claim 11 wherein said response template library generating means is responsive to said updated knowledge database for generating an updated template library.

18. A market research system as recited in claim 11 wherein said response template library generating means is responsive to both said updated knowledge database and an identified predetermined time period for generating an updated template library.

19. A market research system for management of manufacturer's discount coupon offers comprising:

coupon processing means for processing coupon redemption data; said coupon redemption data including offer identification and predetermined offer variables;

a manufacturer having manufacturer input means for providing a coupon release input; and central controller means coupled to said coupon processing means and said manufacturer input means for receiving said coupon redemption data and said coupon release input; said central controller means including means responsive to said received coupon redemption data and said predetermined off variables for generating a variables code; means for storing said coupon redemption data by said generated variables code for defining a knowledge database; means responsive to said defined knowledge database for generating a response template library; means responsive to said received coupon release input for selecting a response template from said generated response template library; and means for transmitting said selected response template to said manufacture.

20. A market research system as recited in claim 19 wherein said response template library generating means includes means responsive to said redemption data; and means for calculating an average redemption value and a standard deviation value for said extracted coupon redemption data at predetermined intervals within a predefined time period.

* * * * *

UNITED STATES PATENT AND TRADEMARK OFFICE
CERTIFICATE OF CORRECTION

PATENT NO. : 5,245,533
DATED     : September 14, 1993
INVENTOR(S) : ROBERT MARSHALL It is certified that error appears in the above-indentified patent and that said Letters Patent is hereby corrected as shown below:

Col. 3, line 63 insert after "each"
    the words --household.  Alternatively, such
    retail product purchase--

Col. 4, line 20 insert after "U.S."
    the word --Letters--

Signed and Sealed this

Nineteenth Day of July, 1994

Attest:

BRUCE LEHMAN

*Attesting Officer*    *Commissioner of Patents and Trademarks*